Figure 1:
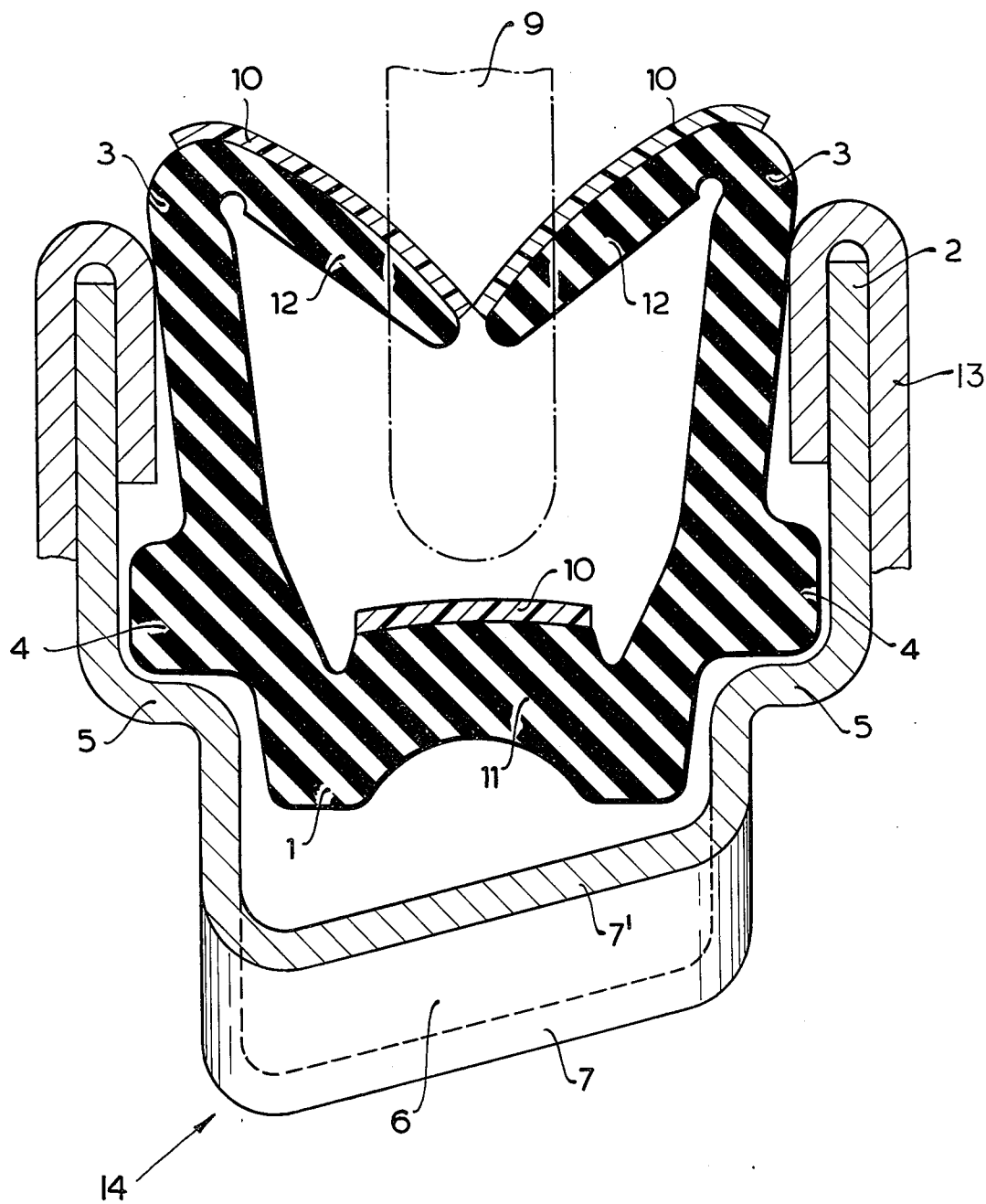

United States Patent
Dochnahl

[11] 3,918,206
[45] Nov. 11, 1975

[54] WINDOW GUIDE
[75] Inventor: Hans Dochnahl, Willich, Germany
[73] Assignee: Draftex GmbH, Viersen, Germany
[22] Filed: Nov. 29, 1973
[21] Appl. No.: 420,138

[30] Foreign Application Priority Data
Dec. 2, 1972  Germany............................ 2259041

[52] U.S. Cl.................................... 49/441; 49/489
[51] Int. Cl.² ........................................... E06B 7/16
[58] Field of Search ............ 49/440, 441, 442, 490, 49/489; 52/716–718

[56] References Cited
UNITED STATES PATENTS
2,726,894  12/1955  Bugbee ................................ 49/441
3,131,439  5/1964  Wilfert .............................. 49/440 X
3,401,075  9/1968  Jackson ............................ 49/441 X

*Primary Examiner*—Philip C. Kannan
*Attorney, Agent, or Firm*—Hans Berman

[57] ABSTRACT

A window guide arrangement for sealing and guiding a movable window pane of an automobile consists of a channel-shaped gasket of resilient material, such as rubber or plastics, and a mounting channel for the gasket which is generally U-shaped in cross section. Longitudinal ribs on the outer flange surfaces of the gasket abut against shoulders on the flanges of the mounting channel to secure the gasket while leaving a free space between the respective web portions of the gasket and mounting channel.

8 Claims, 2 Drawing Figures

WINDOW GUIDE

This invention relates to a window guide arrangement for sealing and guiding a movable window pane, particularly in an automobile, which consists of a channel-shaped gasket of resilient material, such as rubber or plastics, and a generally U-shaped mounting channel for the gasket.

The gasket of an automobile window is sometimes secured in a mounting channel by gluing, but usually by clamping, the gasket being held in the mounting channel by the resiliency of its material, as described, for example, in German Utility Model No. 6,943,065. The base of the gasket in the known arrangement rests on the web of the mounting channel. The specially shaped sides of the gasket rest against the flanges of the mounting channel and prevent the gasket from being pulled out when the window pane moves.

For design reasons, the automobile industry has recently changed over to body columns carrying the car roof which converge towards the roof. The columns are made of sheet metal and may serve also as mounting channels for the window gaskets on the car doors, and the depth of such channels is not uniform over their length. At the lower end of the mounting channel, the base of the gasket no longer rests on the web of the mounting channel, and the gasket may be driven into the channel, particularly after relatively long use, so that the window is no longer securely guided and sealed.

It is an object of this invention to provide a window guide arrangement which reliably guides and seals the window pane of an automobile even if the mounting channel for the window gasket varies in depth over its length.

Figure 2:
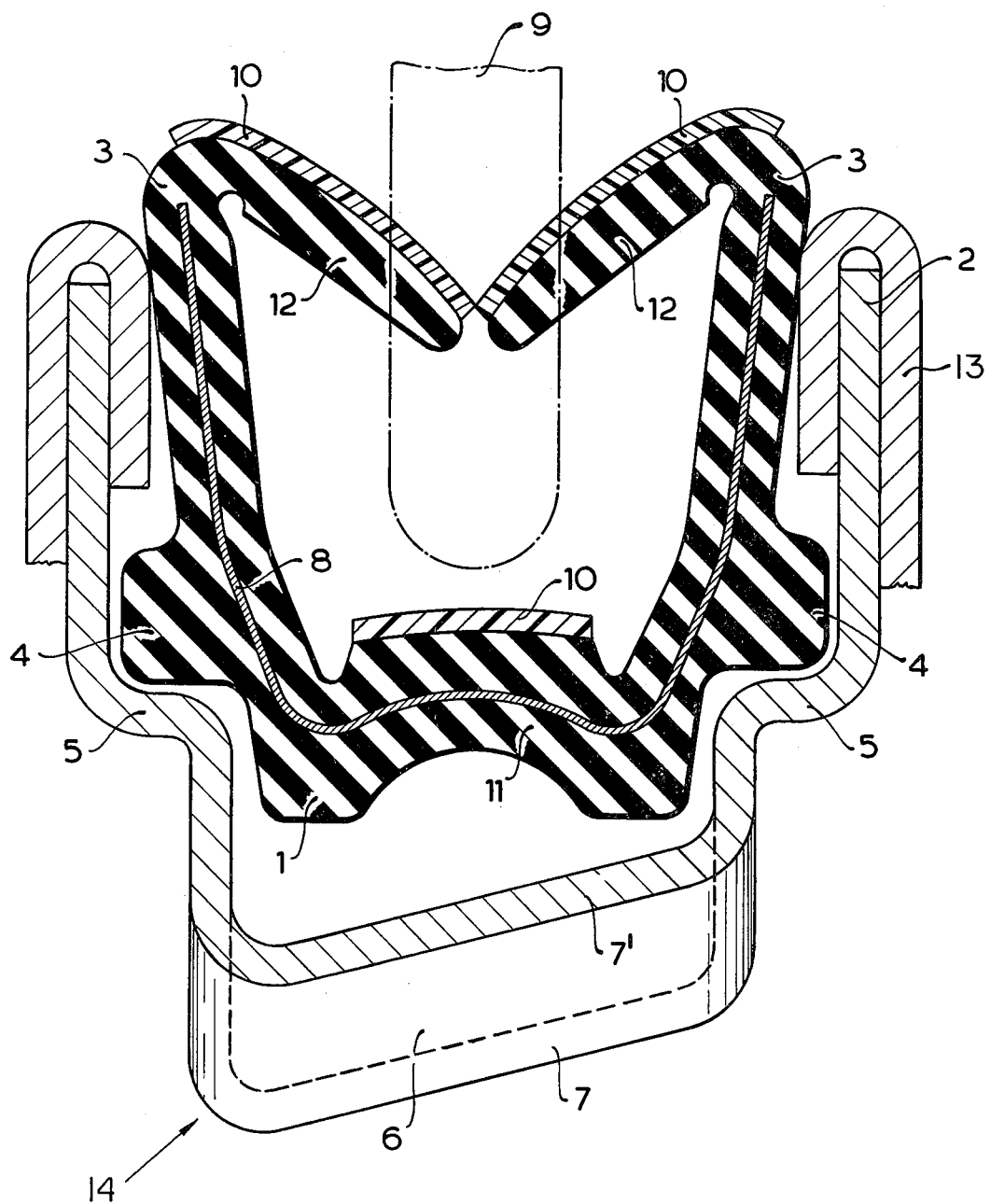

By way of example, two embodiments of the invention will be described with reference to the accompanying drawing in which:

FIG. 1 shows a window in the door of an automobile in fragmentary plan section; and FIG. 2 shows a modification of the device of FIG. 1 in a corresponding view.

Referring intially to FIG. 1 there is shown only as much of a window in the door of an automobile as is needed for an understanding of the invention. The window pane 9, shown in phantom view, is sealed to the upright side of the window frame 13, only partly shown, by a resilient gasket 1 which is generally channel-shaped, having a web 11 and two flanges 3. Integral sealing lips 12 hingedly project from the free edges of the flanges 3 toward each other to receive the pane 9 therebetween in sealing engagement. The portions of the flanges 3 adjacent the web 11 carry longitudinal ribs 4. The faces of the lips 12 and of the web 10 which engage the window pane 9 in normal service carry an antifriction coating 10 of polytetrafluoroethylene.

The gasket 1 is received in the cavity of a mounting channel 14 which is approximately U-shaped in cross section. The portions of its flanges 2 remote from the web 7' are offset outwardly so as to form shoulders 5 on the inner flange faces adjacent the ribs 4 on the gasket 1. The web 7' of the mounting channel 14 slopes from its lower end 7 upward toward the web 11 of the gasket 1 so that the webs 7', 11 bound an air space 6 therebetween. The mounting channel 14 is fastened to the remainder of the car body by sheet metal elements of the frame 13.

Portions of the frame 13 project in the cavity of the channel 14 toward each other to provide abutments for engagement with the ribs 4 when the gasket 1 moves outward of the channel cavity from the illustrated position. The spacing of each shoulder 5 and the associated abutment on the frame 13 is greater than the corresponding dimension of the rib 4.

Movement of the gasket 1 inward of the channel 14 is prevented by abutting engagement of the ribs 4 with the shoulders 5. The width of the air space 6 may thus be selected at will to accomodate a locking mechanism or similar fittings.

The guide arrangement illustrated in FIG. 2 differs from the afore-described device by the provision of a metal strip 8 embedded in the web 11 and flanges 3 of the gasket 1 for reinforcement of the gasket. The reinforcing strip is particularly useful when the free edges of the flanges 3 are not secured by elements of the window frame 13 against which the flanges 3 may abut. The reinforcing metal strip may be limited to the web of the gasket 1, but extends beyond the ribs 4 in the illustrated embodiment to assist in preventing the gasket from being pushed from its operative position toward the web 7'.

The lips 12 extend from the edge parts of the flanges 3 which project beyond the strip 8 away from the web 11.

What I claim is:

1. A guide arrangement for sealing and guiding a movable pane comprising:
   a. an elongated mounting channel of approximately U-shaped cross section including a web and two flanges extending from said web in a common direction spaced relationship,
      1. a first portion of each flange being adjacent said web, and a second portion being remote from said web and including a free edge portion,
      2. said web and said flanges bounding a cavity in said channel,
      3. said second portions being offset from said first portions outward of said channel so as to define a shoulder one each flange in said cavity;
   b. an elongated channel-shaped gasket of resilient material in said cavity,
      1. said gasket having a web portion, two flange portions extending from said web portion in a common direction, and a longitudinal rib projecting from each flange portion in a direction away from the other flange portion,
      2. each rib being offset from an associated one of said shoulders outwardly of said cavity for abutting engagement with the associated shoulder when said gasket moves inward of said cavity,
      3. said web and said web portion bounding an air space therebetween when said ribs abuttingly engage the associated shoulder; and
   c. abutment means projecting from each of said flanges toward the other flange and engaging one of said ribs when said gasket moves outward of said cavity and said one rib is moved thereby away from said aubtting engagement with the associated shoulder, the spacing of said shoulder and of said abutment means being greater than the dimension of said rib in the direction of movement of said gasket inward and outward of said cavity.

2. A guide arrangement as set forth in claim 1, further comprising a metallic reinforcing strip member embedded in said web portion.

3. A guide arrangement as set forth in claim 1, further comprising an antifriction coating on a face of said web portion intermediate said flange portions.

4. A guide arrangement as set forth in claim 1, wherein said rib consists of said material.

5. A guide arrangement as set forth in claim 4, further comprising a metallic reinforcing strip member embedded in said web portion and said flange portions.

6. A guide arrangement as set forth in claim 1, wherein said flange portions have free edges remote from said web portion, said gasket further having two lip portions integral with said flange and web portions, each lip portion extending from the free edge of one flange portion toward the other flange portion.

7. A guide arrangement as set forth in claim 6, further comprising an anti-friction coating on a face of each of said lip portions, said face being directed away from said web portion.

8. A guide arrangement as set forth in claim 6, further comprising a metallic reinforcing strip member embedded in said web portion and in said flange portion, said free edges projecting beyond said strip member in a direction away from said web portion.

* * * * *

UNITED STATES PATENT AND TRADEMARK OFFICE
CERTIFICATE OF CORRECTION

PATENT NO. : 3,918,206
DATED : November 11, 1975
INVENTOR(S) : HANS DOCHNAHL

It is certified that error appears in the above-identified patent and that said Letters Patent are hereby corrected as shown below:

In claim 1, line 6 (line 34 of column 2), after "rection" insert -- in --;

line 14 (line 42 of column 2), change "one" to -- on --;

line 28 (line 56 of column 2); change "shoulder" to -- shoulders --.

Signed and Sealed this seventeenth Day of February 1976

[SEAL]

Attest:

RUTH C. MASON
*Attesting Officer*

C. MARSHALL DANN
*Commissioner of Patents and Trademarks*